United States Patent [19]
Radocaj

[11] Patent Number: 6,112,391
[45] Date of Patent: Sep. 5, 2000

[54] AUTOMATIC LOADER-UNLOADER FOR DISK BLANK WORKPIECES

[76] Inventor: Mijo Radocaj, 1912 Amherst Rd., NE., Massillon, Ohio 44646

[21] Appl. No.: 09/376,745

[22] Filed: Aug. 17, 1999

[51] Int. Cl.[7] .............................. B23Q 7/04; B23P 23/00; B65G 59/04; B21D 22/10
[52] U.S. Cl. .......................................................... 29/33 R
[58] Field of Search .................................... 29/34 R, 56.5, 29/33 R; 409/269; 82/124, 125; 414/744.2, 751, 738; 72/82, 88, 83, 420, 426, 427, 84

[56] References Cited

U.S. PATENT DOCUMENTS

| | | | |
|---|---|---|---|
| 3,639,968 | 2/1972 | Price et al. ................................ | 29/211 |
| 3,750,806 | 8/1973 | Bartleet ................................ | 214/8.5 F |
| 3,887,084 | 6/1975 | Gallo et al. ........................... | 214/1 BB |
| 3,910,426 | 10/1975 | Wagner .................................... | 414/751 |
| 3,956,914 | 5/1976 | Prochaska ................................ | 72/82 X |
| 4,170,889 | 10/1979 | Tanimoto et al. ........................... | 72/85 |
| 4,181,315 | 1/1980 | Ridderström .............................. | 414/590 |
| 4,404,829 | 9/1983 | Dorakovski .............................. | 72/84 |
| 4,544,315 | 10/1985 | Muskulus ................................ | 414/115 |
| 4,561,275 | 12/1985 | Itov et al. .......................... | 29/33 R X |
| 4,648,774 | 3/1987 | Dorumsgaard et al. ............ | 414/738 X |
| 4,787,806 | 11/1988 | Aupperle .............................. | 414/738 X |
| 5,562,387 | 10/1996 | Ishii et al. .............................. | 414/416 |
| 5,735,660 | 4/1998 | Ellis ....................................... | 414/225 |
| 5,987,952 | 11/1999 | Kutzscher et al. ...................... | 72/83 X |

*Primary Examiner*—William Briggs
*Attorney, Agent, or Firm*—Paul E Milliken; Lee A Germain

[57] ABSTRACT

An electronically-controlled apparatus has a feed assembly for moving circular disk blank workpieces from a storage position to a pickup position where a pickup mechanism receives the workpiece and then carries it to an operational position within a machine tool which converts the workpiece into a pulley or like-type device while simultaneously the pickup mechanism receives a finished disk product and delivers it a collection device.

21 Claims, 5 Drawing Sheets

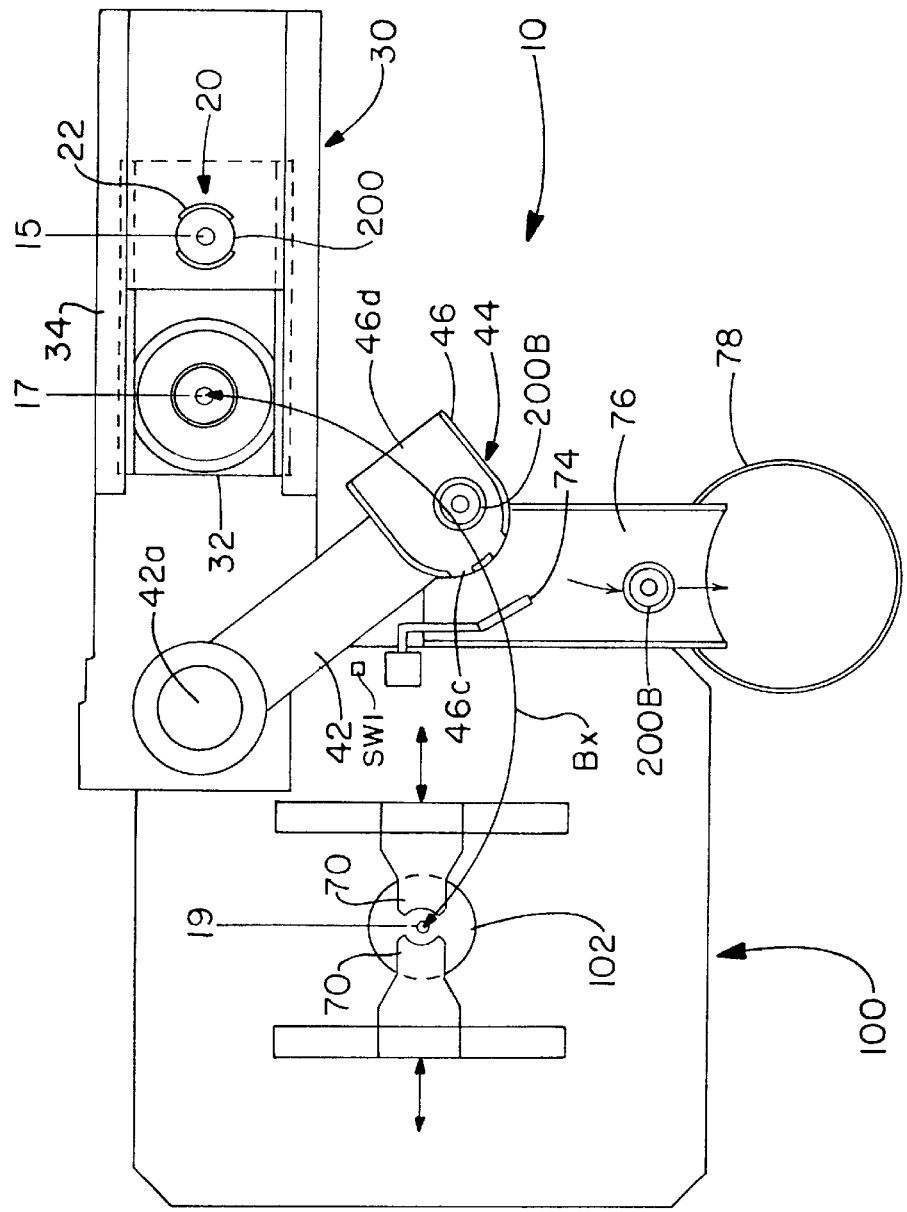
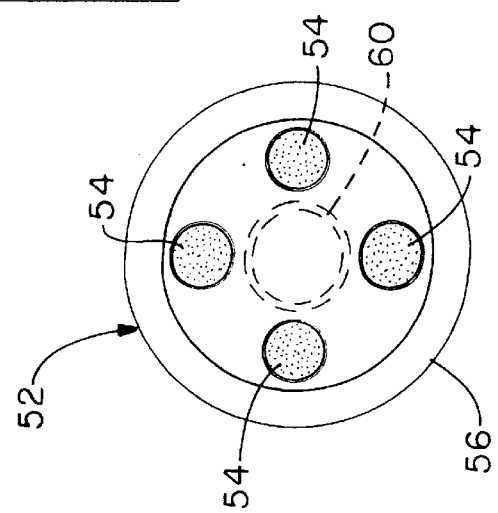
FIG.-6
FIG.-5

ન6,112,391

AUTOMATIC LOADER-UNLOADER FOR DISK BLANK WORKPIECES

FIELD OF THE INVENTION

This invention generally pertains to machine tools which convert solid, circular, disk blank workpieces into finished products such as pulleys, sheaves and like-type devices for automotive and/or industrial applications.

More particularly, this invention provides an apparatus adapted to function in association with a machine tool, which apparatus automatically feeds a workpiece blank into operational position within the machine tool while simultaneously it collects a finished product and deposits such product for distribution or other purposes.

Specifically, this invention provides an apparatus comprised of an assembly for moving disk blank workpieces from a first storage position to a second pickup position and then to a third operational position within a machine tool where the workpiece is transformed into a finished product while simultaneously it receives a finished disk product and delivers it for distribution or other purposes.

BACKGROUND OF THE INVENTION

In the art of metal fabrication, methods are disclosed for transforming solid circular workpiece blanks into pulleys and like-type bodies via splitting of the exposed peripheral edge of the workpiece blank. U.S. Pat. Nos. 3,758,930 and 3,828,619 disclose such methods while U.S. Pat. No. 3,225,525 suggests other metal splitting techniques to form pulleys and wheel flanges.

In a prior patent application identified by Ser. No. 09/035,570 filed Feb. 19, 1998 the present inventor discloses a machine tool which splits and swages the outer peripheral edge of a solid disk blank workpiece to form a pulley groove while simultaneously it swages an inner bore edge of the workpiece to form bearing retaining flanges. The teaching of this prior invention is incorporated by reference herein as it may pertain to the present inventive concept.

The present invention, however, provides an apparatus which operates in association with a machine tool as may be described in the art, which apparatus loads a solid disk workpiece blank into the machine tool while simultaneously it unloads a finished split and swaged product out of the machine tool and delivers it to a collection device.

It is in accordance with at least one aspect of the present invention an object to provide an automatic loading and unloading apparatus for a machine tool in which both the machine tool and apparatus of the invention are computer controlled for a continuous and completely automatic operation.

SUMMARY OF THE INVENTION

This invention provides a computer-controlled apparatus comprising a feed assembly for moving disk blank workpieces from a storage position to a pickup position where a pickup mechanism receives the workpiece and then carries it to an operational position within a machine tool, which machine tool converts the workpiece blank into a pulley or like-type product while simultaneously the pickup mechanism accepts a finished disk product and delivers it to a collection device.

BRIEF DESCRIPTION OF THE DRAWINGS

The features and advantages of the present invention will be better understood and appreciated from a consideration of the following detailed description when taken in conjunction with the accompanying drawings in the several figures in which like-reference numerals and/or letters indicate like elements and in which:

FIG. 5 is a bottom view of a magnetic pickup which forms an integral part of the mechanism shown in FIGS. 3 and 4;

FIG. 6 is a top view similar to FIG. 2 but with some elements removed and other elements moved to alternative operating positions for the purposes of this description.

DETAILED DESCRIPTION OF THE PREFERRED EMBODIMENTS

Figure 1:
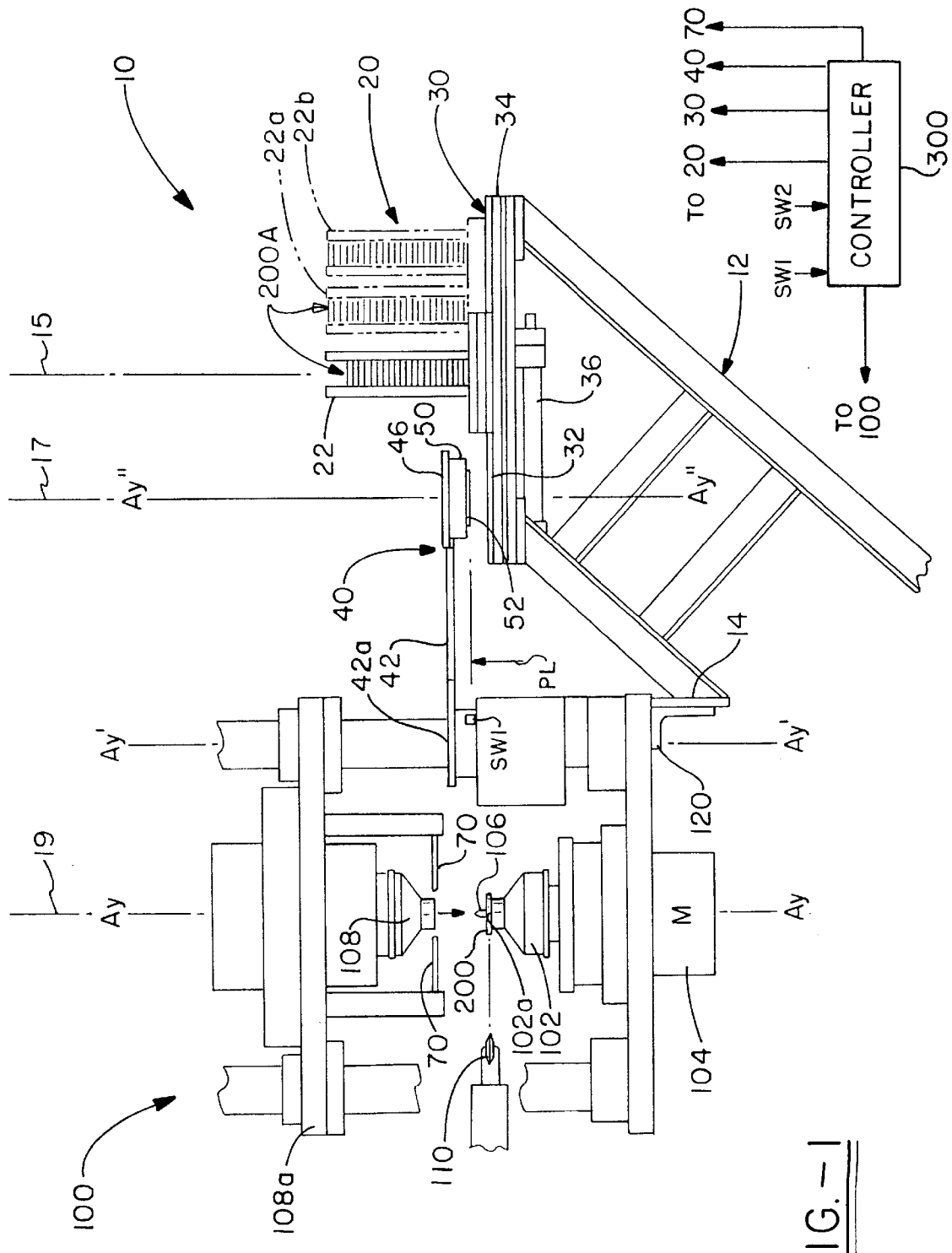
FIG. 1 is an elevational view illustrating the loader-unloader apparatus of the invention as such may be applied to operate in association with a machine tool of a type which converts solid circular workpiece blanks into a pulley or like-type product.
Figure 2:
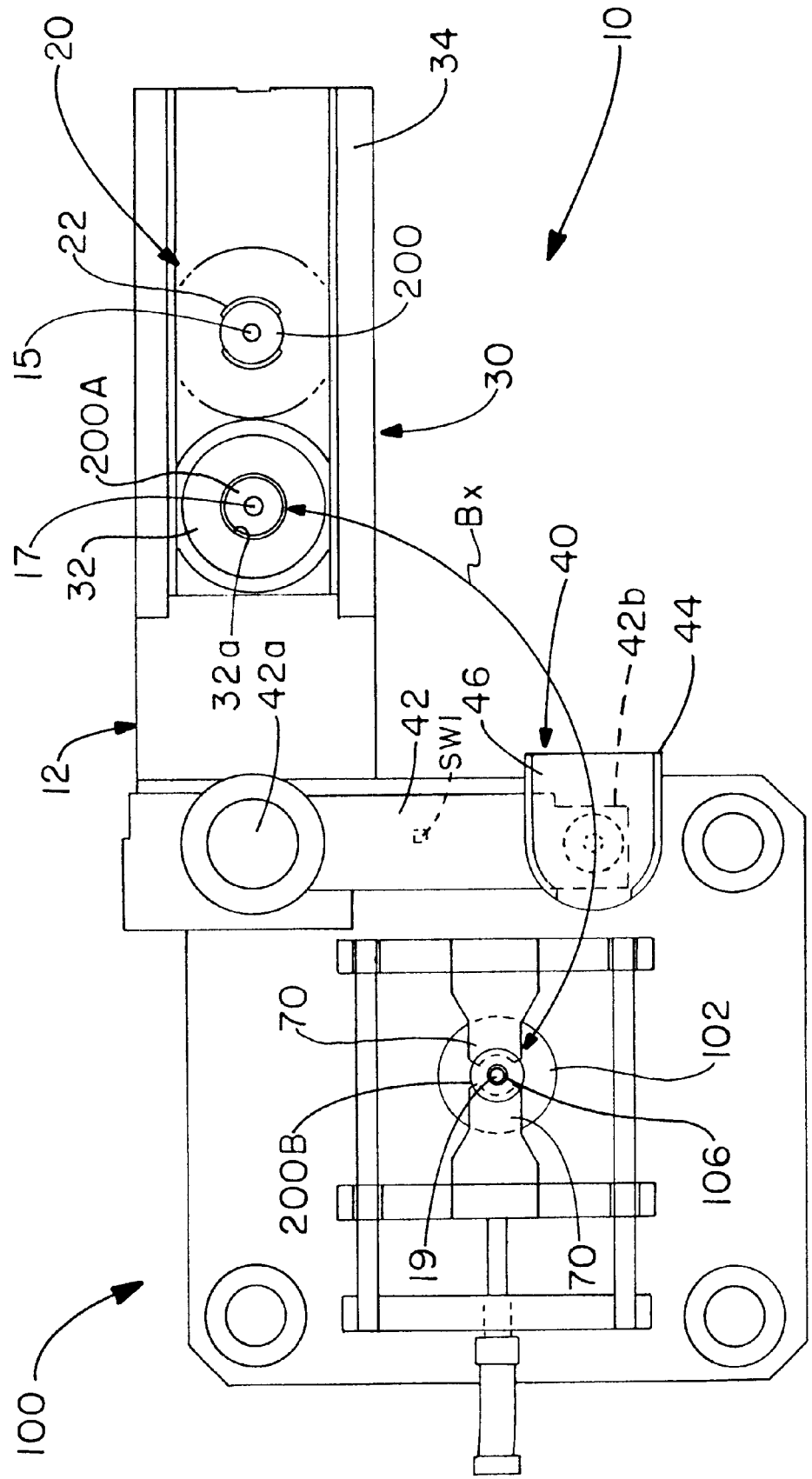
FIG. 2 is a top view of the apparatus shown in FIG. 1 with portions of the machine tool removed for the purposes of the detailed description.

Referring to FIGS. 1 and 2 of the drawings, an apparatus for loading and unloading circular disk blank workpieces is illustrated and generally indicated by reference numeral 10 as such apparatus may be mounted in functional association with a machine tool which is generally indicated by reference numeral 100.

Firstly, the machine tool 100 is of the type designed to convert a workpiece blank as defined by a solid metal disk 200 into a pulley or like-type configuration. The machine tool 100 cuts or splits the outer peripheral edge of the disk blank 200 to a specific depth of penetration and thereafter swage-forms the split edges into the desired shape as the disk blank is rotated within the machine tool. The machine tool 100 is characterized by a lower rotatable spindle means 102 which may be driven by a motor 104 in a conventional manner. The spindle 102 has an upper surface configuration 102a which is adapted for receiving a disk blank 200 thereon such that rotation of the spindle 102 also effects rotation of the disk blank 200 about a vertical axis as indicated at line Ay—Ay in the figure. The spindle 102 may be characterized by a locating or centering pin 106 which functions to position a disk blank 200 in Ay axial position on the spindle surface 102a.

The machine tool 100 also includes an axially oriented and rotatable upper spindle 108 which may be raised and lowered along the Ay axis with respect to the lower spindle 102. Upon lowering of the upper spindle 108, an engagement is made with a disk blank 200 carried on the spindle surface 102a. This engagement effects a clamping action of the disk blank between the two rotatable spindles 102 and 108.

From the foregoing description it will be appreciated that rotational motion as effected by the motor 104 of the spindle 102 also effects rotational motion of the upper spindle 108 through an interaction with the disk blank 200. Of course, the upper spindle 108 may be rotated by a motor means 104 mounted above it to thus effect rotational motion of the lower spindle 102 through the interaction of the disk blank 200. This alternative action is considered within the knowledge and expertise of the machinist setting up the machine tool 100 for splitting and swage-forming operations.

The machine tool 100 also includes a movable cutting or splitting tool 110 which is mounted in a position to be moved horizontally into engagement with the peripheral edge of disk blank 200 carried between the two rotatable spindles 102 and 108, Upon rotational motion of the disk blank and engagement of the splitting tool 110, the peripheral edge of the disk is split into two equal upper and lower half portions. The splitting tool 110 may be characterized by a swage configuration such as to effect swage-forming of the split peripheral edges as the splitting portion of the tool enters the workpiece.

While the disk blank 200 may be split and swage-formed by a single tool 110, a separate swage-forming tool (not shown) may also be positioned within the machine tool 100 to move horizontally into engagement with the peripheral edge of the disk as it is being split by a splitting tool. The swage-form operation converts the peripheral edge of a disk blank 200 into the desired pulley groove shape or other configuration in the known manner. A more complete understanding of machine tool splitting and swage-forming operations may be had by referring to the applicant's prior invention as referenced hereinbefore.

Automatic loading of disk blank workpieces into the machine tool 100 and unloading of formed and finished disk products from the machine tool may be accomplished by this present invention which is generally indicated by reference numeral 10. The inventive concept will first be described with respect to loading of disk blank workpieces 200A into the machine tool 100 and hereinafter will be described with respect to unloading of formed disk products 200B out of the machine tool 100.

The apparatus 10 comprises a disk blank storage assembly generally indicated by reference numeral 20. The storage assembly 20 comprises at least one vertical chute member 22 which is adapted to carry a plurality of disk blank workpieces 200A in a vertical stack orientation. The height of the stack may, of course, vary but it has been found that a two-foot height works well in this application. The apparatus 10 also comprises a slide tray assembly generally indicated by reference numeral 30 which is mounted directly below the storage assembly 20, The assembly 30 comprises a disk blank holding tray 32 which has a circular counterbore or slot 32a designed to hold a single disk blank workpiece 200A in axial position below a disk storage chute 22. The tray 32 is slidably received within a slide frame 34 and movable horizontally therein via hydraulic, pneumatic, or electrical means indicated at numeral 36. A hydraulic means 36 is shown in the figure and it will function to move the slide tray 32 from a first disk blank loading position indicated at reference numeral 15 to a disk blank pickup position indicated at reference numeral 17. When the slide tray 32 is at the disk blank loading position 15, a single disk blank workpiece 200A is received within the tray counterbore 32a and the slide tray 32 is moved to the disk blank pickup position at reference numeral 17. The storage assembly 20 and the slide tray assembly 30 are both mounted to a framework 12 which may be positioned relative to the machine tool 100 for operation or, alternatively, may be attached or otherwise affixed to the machine tool framework 120 as shown at reference numeral 14.

It is, of course, anticipated that the disk blank storage assembly 20 may take various configurations. For example, any number of storage chute members 22 may be indexed into position at reference numeral 15 for depositing workpieces 200A into the slide tray counterbore 32a. This may be accomplished via a serially indexed device with a plurality of chute members 22 oriented in a long row or via a carrousel or like-type device which is adapted to carry a plurality of chute members 22a, 22b, . . . etc. and then rotatably indexed into workpiece loading position at reference numeral 15 as each such chute member is emptied of its load of workpieces 200A.

The apparatus 10 also comprises a pickup arm assembly generally indicated by reference numeral 40. The assembly 40 comprises a pickup arm 42 which is mounted for rotational motion at 42a about a vertical axis indicated by line Ay'—Ay'. The arm 42 moves through a horizontal arc Bx such that it's distal end 42b is moved from a disk blank pickup position at 17 in axial alignment with the Ay" axis to a disk blank depositing position at reference numeral 19 which is within the machine tool 100 in alignment with the vertical Ay axis. The length of the pickup arm 42, of course, may be varied at the discretion of the machinist and the invention, therefore, is not considered limited to the particular length which may be determined from the drawings.

Figure 3:
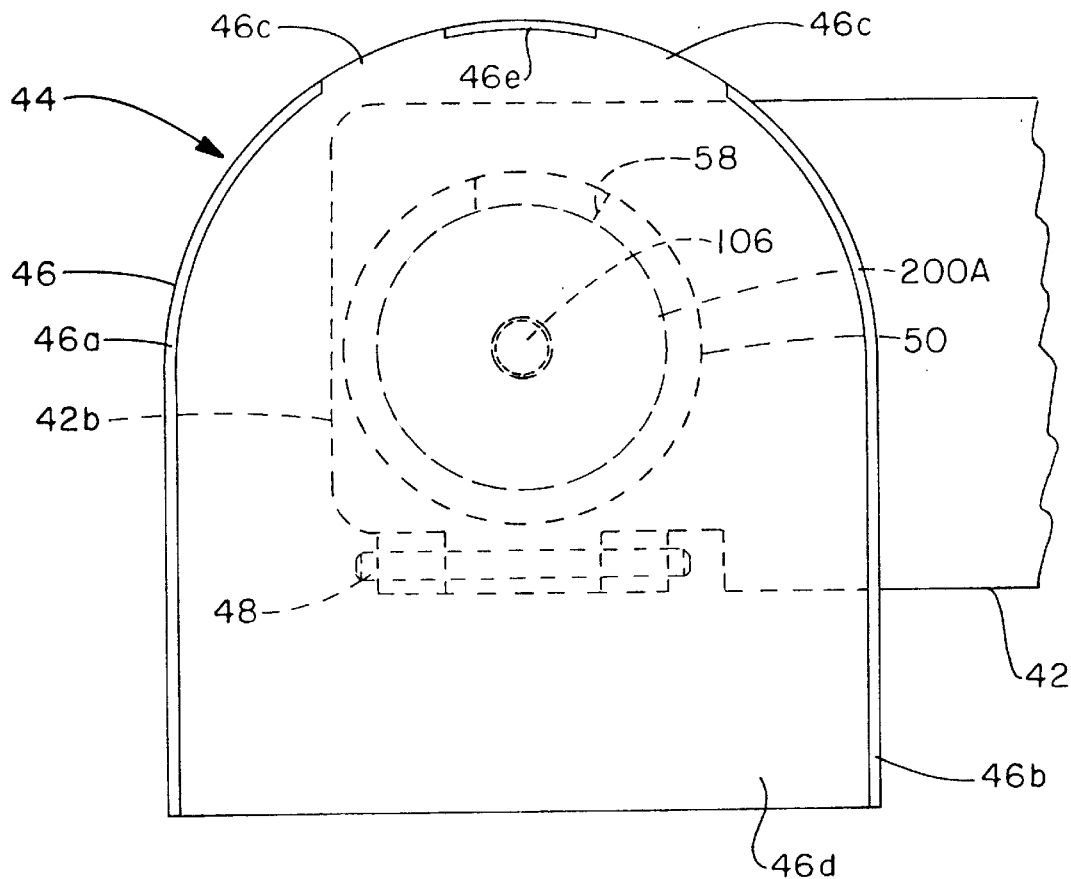
FIG. 3 is a top view of a disk blank and product pickup mechanism which forms an important part of the present invention.
Figure 4:
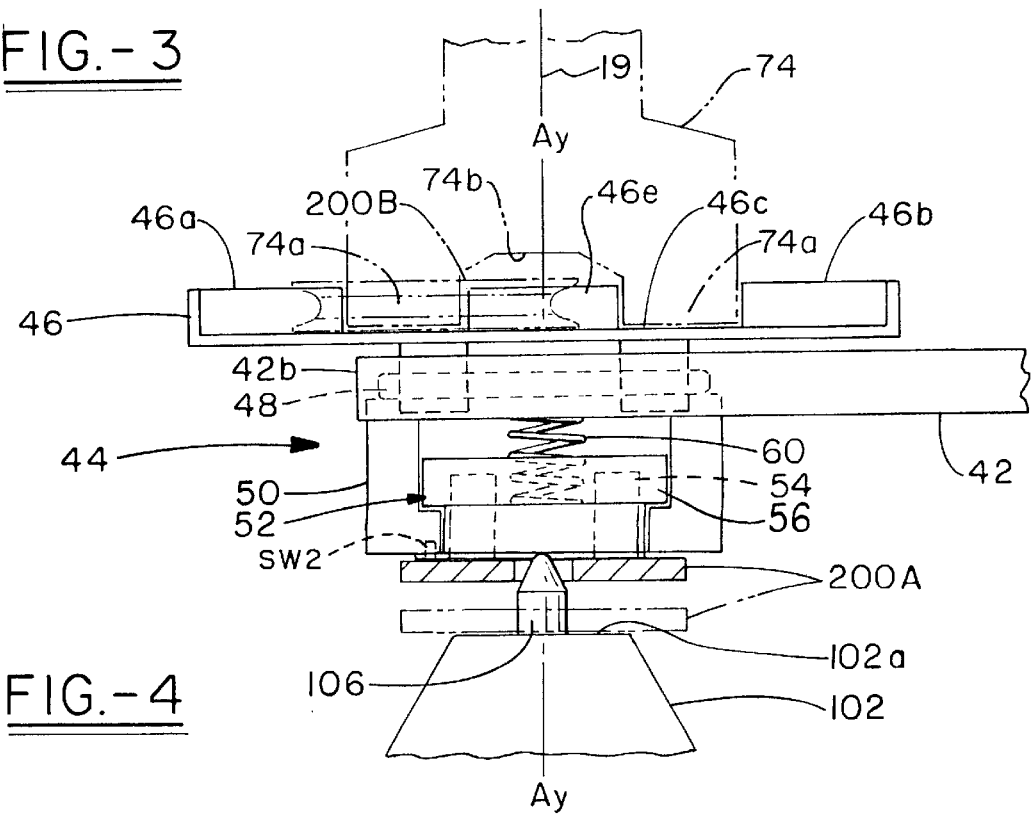
FIG. 4 is an elevational view with portions broken away and in cross-section of the pickup mechanism shown in FIG. 3 as such may be moved in operational position with respect to a machine tool rotatable spindle.

The pickup arm assembly 40 also includes a disk blank pickup mechanism 44 carried at the distal end 42b of the arm 42. With particular reference now to FIGS. 3, 4, and 5 of the drawings, the disk blank pickup mechanism 44 includes a disk product receiving tray 46 mounted on the top of a housing 50. These are affixed to the distal end 42b via pin or bolt means indicated at reference numeral 48. The housing 50 is characterized by magnetic pickup means 52 having a plurality of magnets 54 mounted in a stainless steel carrier 56. The magnetic means 52 is movable vertically and is biased in the downwardly direction by a spring or other means 60. It is anticipated that other pickup means 52 may be utilized to accomplish this function. For example, an electromagnetic device may be used which receives a function signal when such is required to activate the device. The magnetic pickup means 52 as illustrated in the drawings is preferred in that it is foolproof and simple. In any event, this invention is not considered limited to the particular pickup device shown in the drawings.

In the operation of the pickup arm assembly 40, the disk blank pickup mechanism 44 is rotated to an axial Ay" position at reference numeral 17 where it is lowered from a passpoint level indicated at arrow PL toward the slide tray 32 which holds a disk blank workpiece 200A in position for pickup. The passpoint level PL is that height level needed such that when the pickup mechanism 44 moves into the machine tool 100 there is no interference between it and the centering pin 106 carried by the lower spindle 102. Continuing, when the pickup mechanism 44 is lowered, a workpiece 200A is drawn out of the counterbore 32a in the slide tray 32 to the magnetic pickup means 52. The pickup arm 42 is then rotated toward the machine tool for delivery of the workpiece blank 200A.

The pickup mechanism 44 is moved to the axial Ay position at reference numeral 19 where it is lowered toward the spindle centering pin 106. In this position, the pin 106 engages the stainless steel carrier 56 forcing it upwardly and effecting a disengagement of the disk blank workpiece 200A with the magnets 54 of the pickup means 52. A workpiece blank 200A is therefore dropped onto the surface 102a of the spindle 102.

The instant that a workpiece blank 200A is deposited on the lower machine spindle 102, the pickup arm 42 is ready to rotate out of the machine tool 100 to return to the pickup position at reference numeral 17 where another disk blank workpiece 200A has been deposited in the slide tray 32 and is waiting for pickup. In this respect it will be appreciated that the pickup mechanism 44 does not have to be raised in order to avoid making contact with the centering pin 106 as was the case when it entered the machine tool with a workpiece blank 200A being carried by the magnetic pickup means 52 This is because the pickup housing 50 is provided with an opening or slot indicated in FIG. 3 at reference numeral 58. The slot 58 allows the machanism 44 to rotate while the pin 106 passes through the slot when the machanism 44 is in the lowered position for depositing a disk blank workpiece 200A on the spindle 102. The pickup mechanism 44, however, is raised again to the passpoint height level PL as it travels back to the pickup point 17. This is accomplished via a microswitch or other suitable sensor SW1 indicated in FIGS. 1, 2, and 6 of the drawings. The sensor SW1 sends a signal which effects raising of the rotatable arm assembly 42 and thus also the pickup mechanism 44 to the passpoint level PL in a continuous manner as it moves to the disk blank pickup position at reference numeral 17.

The invention will now be described with respect to the disk product unloading feature which is a unique feature of the invention. This feature is accomplished by a configuration of disk product pickup means in the form of fingers 70 which are positioned within the machine tool 100 so as to move downwardly and horizontally for engagement with the swage-formed groove made in the outer peripheral edge of a disk blank workpiece 200A. When a finished disk product 200B is formed by the machine tool process as described, the fingers 70 are moved horizontally a specific distance into the disk product groove such that the disk product 200B may be raised off of the machine tool lower spindle 102. This allows the disk blank pickup mechanism 44 to rotate into the machine tool to the workpiece operating position at reference numeral 19, When the pickup mechanism 44 is axially aligned with the Ay axis, the finger means 70 are moved horizontally apart which allows a disk product 200B to be dropped onto the surface of the disk product receiving tray 46 as illustrated in the FIG. 4 by ghost line showing of a disk product 200B.

While the mounting of the finger means 70 may be made anywhere within the machine tool 100, a preferable mounting may be made directly to the machine tool upper rotatable spindle carriage means indicated at reference numeral 108a. In this way no motion time is lost because the finger means 70 are in proper position to engage a disk product 200B as it moves along with the upper spindle 108 as it moves vertically along the Ay axis.

As described above, a finished swage-formed disk product 200B is dropped onto the surface of the product receiving tray 46 by the finger means 70. In this respect and because the disk products 200B and the product receiving tray 46 are comprised of steel, it is anticipated that a means will be provided on the tray 46 which will maintain the disk product 200B within the confines of the tray as the pickup mechanism 44 is rotated out of the machine tool 100, This is considered necessary if the disk product 200B has a weight whereby any inertia caused by pickup mechanism motion causes the product to slide on the tray. A means which may eliminate this could be provided by magnetic or other suitable material carried on the surface of the tray 46 as the disk products 200B will be comprised of a magnetically affected material such as steel. Clearly, a finished product 200B must be maintained on the tray 46 until a product delivery means can function to remove it. Such removal is accomplished via a disk product sweeper means as indicated at reference numeral 74 in FIGS. 4 and 6 of the drawings.

The disk product sweeper means 74 is mounted outside of the machine tool 100 and within the pathway arc Bx of the product receiving tray 46 as shown in FIG. 6. Firstly, the product receiving tray 46 is configured with retaining walls 46a and 46b along the sides of the tray and these terminate short of the end of the tray to provide openings indicated at reference numerals 46c in FIG. 3. The actual width of the openings 46c is determined by the diameter of the smallest disk product 200B which is to be produced by the machine tool 100. The tray 46 is, therefore, configured with an end wall 46e which establishes the width of the openings 46c. The sweeper means 74 comprises depending sweepers 74a on either side of a bridge portion 74b. The sweepers 74a exhibit a width substantially but not equal to the width of the openings 46c of the tray 46 such that the sweeper 74 may move through the length of the tray and thus carry anything which may be on the tray out of the open end 46d. From a consideration of FIG. 6, it may be appreciated that the rotation of the arm 42 out of the machine tool 100 may exhibit sufficient inertia to move a disk product 200B on the tray 46. In this instance it may be seen that a disk product 200B will be moved toward the substantially closed end 46e of the tray and such product may not be lost out of the tray. Further, it should be noted that the pickup mechanism 44 and thus also the tray 46 are at the lowered position as these move out of the machine tool and the sweeper means 74 cannot be effective with respect to the product receiving tray 46. However and as mentioned hereinbefore, the rotatable arm 42 is raised to the passpoint level PL as it moves through the Bx arc toward the pickup point at reference numeral 17. A finished disk product 200B is therefore maintained within the product receiving tray 46 through the complete travel of the pickup mechanism 44 to the pickup point 17. After picking up a new disk blank workpiece 200A at pickup point 17, the pickup mechanism is rotated back towards the machine tool 100 and within this return motion the sweeper means 74 pass through the disk product receiving tray and the sweepers 74a remove such product from the tray.

A finished disk product 200B that is swept off of the receiving tray 46 is dropped onto a ramp 76 where it is directed into a collection means 78 which may be a bin or a conveyor or other means for distributing finished disk products 200B.

Figure 7:
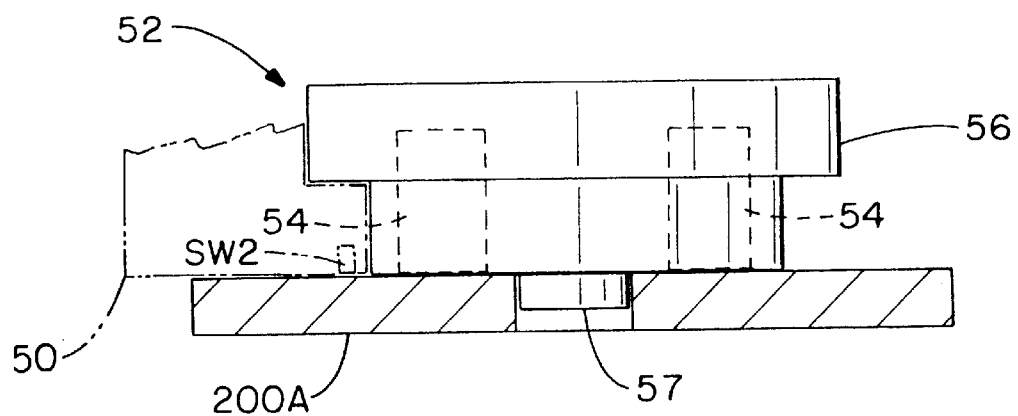
FIG. 7 is an elevational view with portions broken away and in cross-section of an alternative configuration for the magnetic pickup illustrated in FIGS. 3, 4, and 5 of the drawings.

It was mentioned earlier that inertia may cause movement of finished disk products 200A on the product receiving tray 46 as the pickup arm 42 is rotated out of the machine tool 100. It will, of course, be recognized by those knowledgeable of the machine arts that inertia may also pose a problem with respect to maintaining the axial position of a disk blank workpiece 200A on the magnetic pickup means 52 as the pickup arm 42 is rotated from the pickup position 17 toward the workpiece depositing position within the machine tool at 19. This may be solved by including an axially oriented boss 57 on the bottom surface of the magnetic carrier 56 as illustrated in FIG. 7 of the drawings. The boss 57 exhibits a diameter which is slightly less than the diameter of a through-bore in the disk blank workpiece 200A such that minimal horizontal motion is realized due to inertia. It will be recognized that when the pickup mechanism 44 is moved into axial position with respect to the lower machine spindle 102, the locating pin 106 will engage the boss 57 to move the magnetic pickup 52 upwardly thus disengaging a workpiece 200A from the magnets 54.

Further with reference to FIGS. 4 and 7, a suitable microswitch or sensor means SW2 may be mounted on the pickup mechanism 44 to provide a signal indicating whether or not a disk blank workpiece is being carried by the magnetic pickup 52. For example, in the absence of a workpiece 200A, the sensor SW2 may generate a signal which will stop any further operation of the pickup arm 42. This may happen, for example, if a disk blank workpiece 200A is not available within the counterbore 32a of the tray 32 because there are no more workpieces available within a storage chute member 22. In this circumstance, a signal from the sensor means SW2 will keep the pickup mechanism 44 stationed at the pickup point 17. The machine tool 100, however, may continue its swage-forming operations on a workpiece carried by the spindle 102 but upon finishing such operation it will also stop any further action until the problem at the pickup point 17 is corrected.

The various operations of the loader-unloader apparatus 10 and of the machine tool 100 are of necessity under the control of a suitable micro-processor, computer, or controller 300 as shown in FIG. 1 of the drawings. The controller 300 controls the splitting and swaging operations of the machine tool 100 while also establishes the timing sequences of the disk storage assembly 20, the slide tray assembly 30, and of the rotatable arm assembly 40 of the apparatus 10. Because the controller also controls the motions of the spindles 102 and 108 of the machine tool 100 it also simultaneously controls the operation of the product pickup fingers 70 as this is preferably affixed to the upper spindle carriage 108a.

It is anticipated that those knowledgeable of the machine arts will recognize that the operations of the machine tool 100 i.e., the splitting and swage-forming operations may require more time than the time it takes for the rotatable arm assembly 40 to move the pickup mechanism 44 through the Bx horizontal arc from the pickup point 17 to the disk blank workpiece drop-off point within the machine tool at reference numeral 19.

If there is a discrepency between the machine tool and the rotatable arm assembly timing, the arm assembly 40 may be momentarily stopped just before it enters the confines of the machine tool. This may be accomplished by its passage relative to the sensor SW1 in the direction of entry into the machine tool. The sensor SW1 may, therefore, send an appropriate signal to the controller 300 which stops the arm assembly 40 from rotating into the machine tool for the amount of time which may be only a couple of seconds before it continues on into the machine tool to point 19. The rotational motion of the arm 42, therefore, is at a constant speed and this is not a difficult problem to solve. If, for example, the splitting and swage-forming operations take about 8–10 seconds to complete for a particular size disk blank workpiece and the continuous swing arm motion of the of the disk pickup mechanism 44 through the Bx arc is about 4 seconds, the arm motion may be stopped but 4–6 seconds before entering the machine tool 100. This lost time is easily made up by the fact that the disk product pickup fingers 70 may be affixed to the upper spindle carriage assembly 108a and thus move in conjunction with the upper spindle 108. This is a distinct advantage in that the fingers 70 are always in the proper position for moving into a finished disk product 200B for pickup.

While certain representative embodiments and details of the invention have been shown for the purpose of illustrating the invention, it will be apparant that various changes and modifications may be made therein without departing from the spirit or scope of the invention.

What is claimed is:

1. In association with a machine tool having lower and upper rotatable spindles which clamp a disk blank workpiece between them and converts the workpiece into a finished disk product via splitting and swage-forming operations, an apparatus for automatically loading a disk blank workpiece into the machine tool and simultaneously unloading a finished disk product out of the machine tool comprises in combination:

storage means for holding a plurality of disk blank workpieces at a first position and moving a workpiece to a second position;

a rotatable arm assembly having a distal end adapted for picking up a disk blank workpiece at the second position and which moves through a horizontal arc of travel to deposit the workpiece within the machine tool at a third position where the workpiece is converted to a finished disk product;

means for removing a finished disk product from the third position and depositing it onto the distal end of the rotatable arm such that the product may be removed from the machine tool; and sweeper means positioned within the horizontal arc of travel of the distal end of the rotatable arm assembly to sweep a finished disk product off the assembly such that it may be collected for distribution.

2. The apparatus as claimed in claim 1 wherein the storage means comprises at least one disk storage chute which carries a plurality of disk blank workpieces in a vertical stack arrangement and a slide tray mechanism which moves a workpiece from the first position to the second position for pickup by the rotatable arm assembly.

3. The apparatus as claimed in claim 2 wherein the storage means comprises a carrousel carrying a number of disk storage chutes which may be indexed into the first position.

4. The apparatus as claimed in claim 1 wherein the rotatable arm assembly comprises a disk blank workpiece pickup mechanism mounted at the distal end of the arm and characterized by a device adapted for picking up a workpiece from the storage means at the second position and for depositing the workpiece within the machine tool at the third position.

5. The apparatus as claimed in claim 4 wherein the device within the pickup mechanism for picking up and depositing a disk blank workpiece comprises a magnetic pickup means.

6. The apparatus as claimed in claim 5 wherein the magnetic pickup means comprises a stainless steel carrier having a plurality of magnets mounted within it.

7. The apparatus as claimed in claim 6 wherein the carrier is spring biased downwardly within the pickup mechanism such that an upwardly movement of the carrier disengages a disk blank workpiece attached to the magnets.

8. The apparatus as claimed in claim 1 wherein the means for removing a finished disk product from the third position within the machine tool comprises a pair of finger means movable in both vertical and horizontal directions to engage a finished disk product and remove it vertically out of the operational third position.

9. The apparatus as claimed in claim 4 wherein the disk blank workpiece pickup mechanism also comprises a disk product receiving tray on the top of the pickup mechanism and adapted for carrying a finished disk product out ot the machine tool such that the sweeper means may functionally remove the disk product carried on the tray as the pickup mechanism is rotated.

10. The apparatus as claimed in claim 9 wherein the disk product is removed from the receiving tray as the pickup mechanism is rotated toward the machine tool for depositing another workpiece into the machine tool at the third position.

11. The apparatus as claimed in claim 8 wherein the pickup mechanism also comprises a disk product receiving tray on the top of the pickup mechanism such that the finger means may drop a finished disk product onto the tray when the pickup mechanism is within the machine tool at the third position and the finger means are at a vertical limit at the third position.

12. The apparatus as claimed in claim 11 wherein the finger means are carried by and movable with the upper rotatable spindle of the machine tool.

13. The apparatus as claimed in claim 1 wherein the functions of the machine tool and the apparatus for loading and unloading disk blank workpieces and finished disk products are accomplished via an electronic controller.

14. In association with a machine tool which converts a disk blank workpiece into a grooved disk product via a splitting and swage-forming operation, an apparatus for loading a disk blank workpiece into the machine tool and unloading a finished and grooved disk product out of the machine tool comprises in combination:

a disk blank workpiece storage assembly comprising a carrousel of disk storage chutes carrying a plurality of workpieces in a stacked vertical arrangement and a slide tray mechanism mounted below a storage chute to accept a workpiece at a first position and move it to a second pickup position;

a rotatable arm assembly comprising a workpiece pickup mechanism at the distal end of the arm having magnetic pickup means for picking up a disk blank workpiece when the machanism is at the second position and having a disk product receiving tray mounted at its top end for carrying finished disk products out of the machine tool when the pickup mechanism is at the third position;

finger means at the third position within the machine tool and movable in both vertical and horizontal directions to engage a finished disk product within the swage-formed groove and to move the product vertically and then drop it into the product receiving tray of the pickup mechanism when the mechanism is at the third position for delivering another disk blank workpiece into the machine tool at the third position;

sweeper means positioned within the arc of travel of the workpiece pickup mechanism to move through the product receiving tray and push a finished disk product off of the tray; and collection means mounted relative to the sweeper means to receive a finished disk product pushed off of the receiving tray by the sweeper means.

15. The apparatus as claimed in claim 14 wherein the pickup mechanism magnetic pickup means comprises a stainless steel carrier having a plurality of magnets mounted within it and a biasing means is mounted to move the carrier downwardly in the normal position but when moved upwardly a disk blank workpiece attached to the magnets is disengaged therefrom.

16. The apparatus as claimed in claim 15 further comprising a sensor means which detects the presence or absence of a disk blank workpiece carried by the magnets.

17. The apparatus as claimed in claim 16 further comprising a depending circular boss axially positioned on the carrier and exhibiting a thickness dimension less than the thickness dimension of a disk blank workpiece to maintain the axial orientation of a workpiece attached to the magnetic pickup means.

18. A workpiece loader-unloader apparatus for automatically and sequentially placing circular workpieces on a rotatable spindle for forming into a circular item and removing each formed item from the spindle, the apparatus comprising:

a workpiece container mounted in a fixed location relative to the rotary spindle to hold a stack of circular workpieces;

a slide mechanism attached beneath the workpiece container to sequentially remove workpieces from the bottom of the stack and move each workpiece horizontally to a pickup position;

swingable arm means having one end pivotally attached to a vertical pivot and adapted to oscillate in a horizontal arc;

the opposite end of the swingable arm means carrying a workpiece engagement means to pick up a workpiece and move it in an arcuate path from the pickup position to a position over the spindle to be formed into a completed item; and removal means for lifting the completed item off the spindle to a position above the spindle and releasing the completed item onto a receiving member on the swingable arm means;

said receiving member adapted to move the completed item away from the spindle and deposit the completed item in a desired location.

19. A workpiece loader-unloader as claimed in claim 18 wherein the workpiece engagement means includes a magnetic device for holding the workpiece during the movement of the workpiece from the pickup position to the spindle.

20. A workpiece loader-unloader as claimed in claim 18 wherein the movement of the slide mechanism, the swingable arm means, and the removal means is effected by hydraulic actuators.

21. A workpiece loader-unloader as claimed in claim 18 including an electronic controller for automatically regulating the sequential operation of the workpiece loader-unloader.

* * * * *